United States Patent
Clason

[11] 4,107,496
[45] Aug. 15, 1978

[54] VACUUM SWITCHING APPARATUS WITH DOUBLE INTERRUPTION AND INCLUDING AN INTERPOSED BARRIER

[75] Inventor: Jan C. Clason, Hengelo, Netherlands

[73] Assignee: Hazemeijer B.V., Hengelo, Netherlands

[21] Appl. No.: 533,626

[22] Filed: Dec. 17, 1974

[30] Foreign Application Priority Data

Dec. 21, 1973 [NL] Netherlands .......................... 7317611

[51] Int. Cl.² .......................................... H01H 33/00
[52] U.S. Cl. ................................................ 200/144 B
[58] Field of Search ............... 200/144 R, 144 B, 145, 200/148 R, 148 B, 150 E, 243, 302; 317/58; 174/18, 175 F; 361/115, 135

[56] References Cited

U.S. PATENT DOCUMENTS

| | | | |
|---|---|---|---|
| 3,014,109 | 12/1961 | Burger | 200/144 B |
| 3,185,798 | 5/1965 | Titus | 200/144 B |
| 3,405,245 | 10/1968 | Ito et al. | 200/144 B |
| 3,470,341 | 9/1969 | Beddoe | 200/144 B |
| 3,522,404 | 8/1970 | Trayer | 200/302 |
| 3,567,887 | 3/1971 | Maloney | 200/145 X |
| 3,575,564 | 4/1971 | Weston | 200/144 B |
| 3,814,881 | 6/1974 | Cherry et al. | 200/144 B |
| 3,814,882 | 6/1974 | Harrold | 200/144 B |
| 3,870,845 | 3/1975 | Clason | 200/144 B |
| 3,891,896 | 6/1975 | Clason | 317/58 |

*Primary Examiner*—James R. Scott
*Attorney, Agent, or Firm*—Watson, Cole, Grindle & Watson

[57] ABSTRACT

In vacuum switching apparatus for interconnecting a bus bar to a feeder cable and selectively connecting the bus bar and feeder cable to ground, a first vacuum switching path within a housing is connected to a bus bar and a second vacuum switching path within a housing is connected to the feeder cable. A barrier is mounted between the first and second switching paths for conducting switch-off current from either one of the switching paths to ground and means are provided for interconnecting the barrier to ground.

5 Claims, 5 Drawing Figures

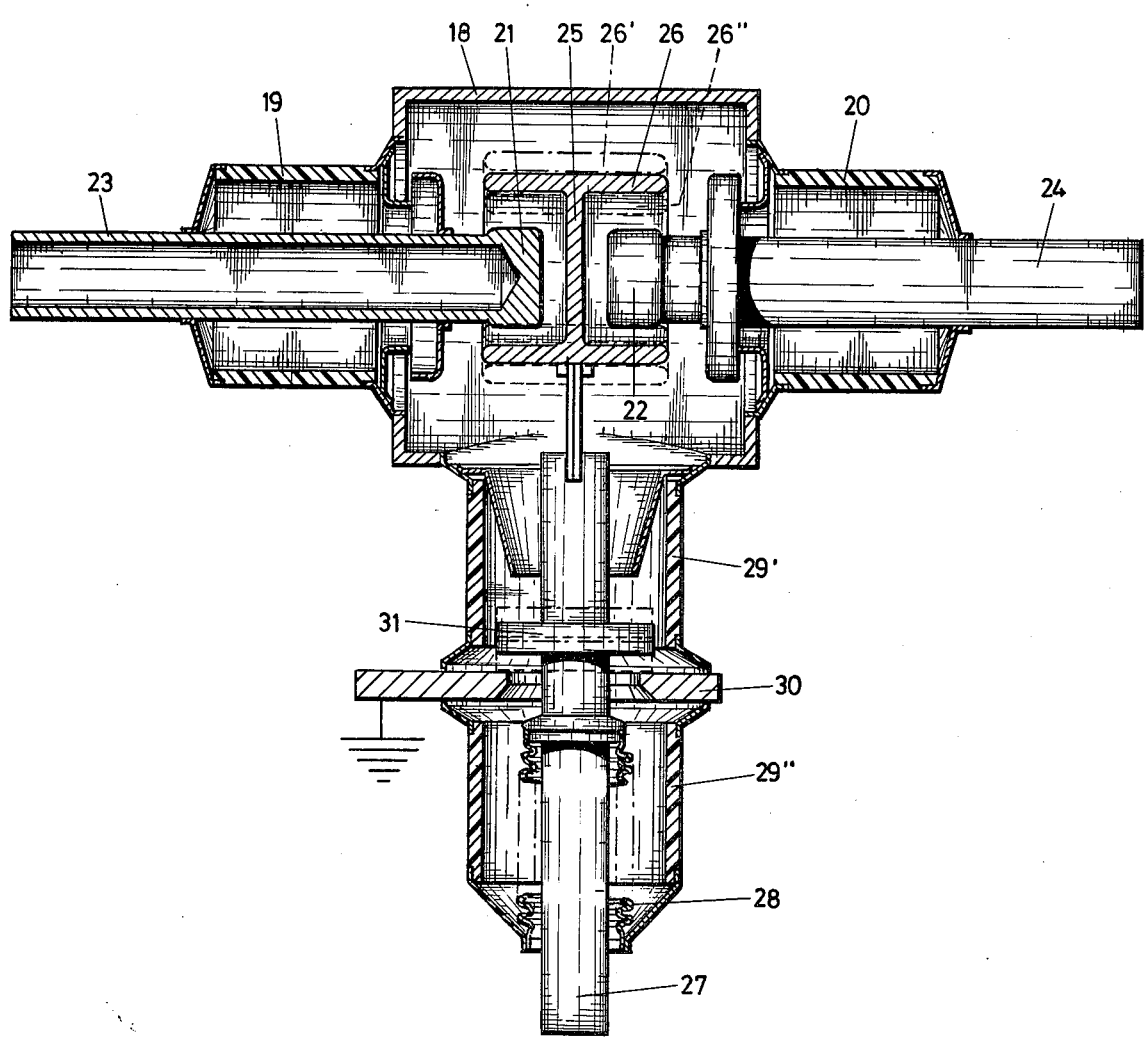

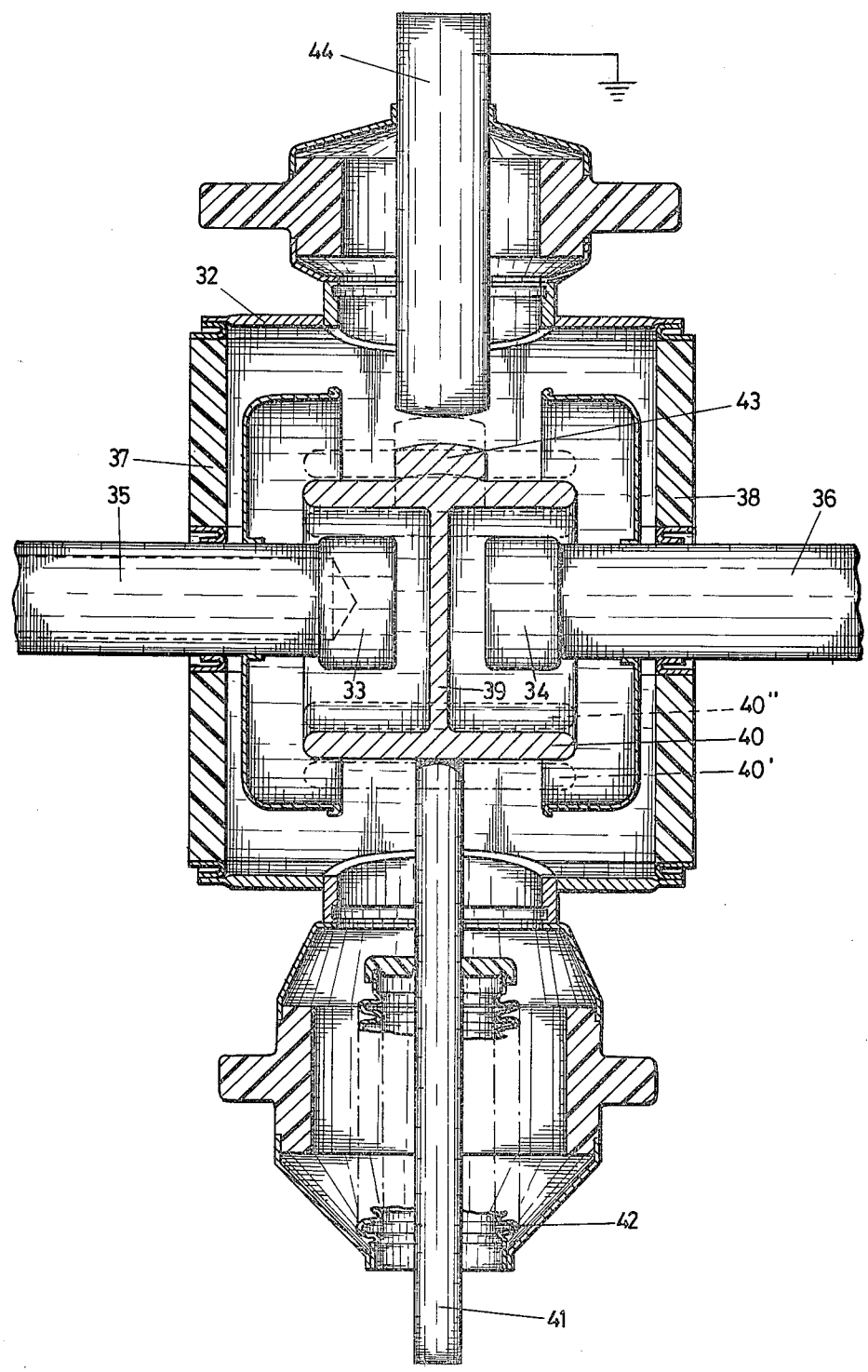

VACUUM SWITCHING APPARATUS WITH DOUBLE INTERRUPTION AND INCLUDING AN INTERPOSED BARRIER

The invention relates to a switching apparatus including two switching paths, which are electrically connected in series and can be operated individually, and an interposed barrier, and a grounding device which can be switched on and off being located between the two switching paths. Such a switching apparatus is known from the Dutch patent application 68.14047.

The known switching apparatus is a high voltage switching apparatus, in which the live conductors are arranged in grounded tube sections, a pressurized gas being present in the tube sections, which insulates the conductors with respect to the grounded tube sections. Such high voltage installations are provided with circuit breakers and isolating switches electrically connected in series on both sides thereof, to which on the one hand cables may be connected and on the other hand a busbar system may be connected, for example. The isolating switches are constituted by two electrically series connected isolating paths, which can be operated individually and between which a barrier is positioned. The barrier has the form of an insulator, which is inserted between two tube sections and acts as closure means for the pressurized gas. In the insulator the movable parts of the two isolating paths have been included, and the movable parts can be connected to ground by means of a grounding pin, which can be operated individually.

If, e.g., a feeder cable has to be made dead or has to be switched off, the following switching operations can be performed. First the circuit breaker in the related circuit is switched off, and next both isolating paths of the isolator, which is arranged between the circuit breaker and the feeder cable are opened and the grounding pin of the isolating switch is engaged. Then the circuit breaker is closed again.

If now a surge voltage, resulting from an overhead line, for example, would intrude into the busbar system of the switching installation, the opened isolating path of the isolator positioned between the circuit breaker and the feeder cable can break down towards the connected grounding pin, and the surge voltage is conducted to ground through the grounding pin. The electrical current flowing through the isolating path broken down and the grounding pin must now be interrupted by the circuit breaker.

The advantage which is achieved herewith is, that the dead cable is not grounded, so that measurements can be made thereon, while the personnel is not in danger since the isolating path on the side of the cable can never break down, providing the grounding contact is switched on.

The isolating switch which is positioned between the circuit breaker and the busbar system need not be operated in making the feeder cable dead and remains closed accordingly. Yet the isolating switch, at least with the known arrangements of switching installations, can not be omitted, since in order to achieve the same advantage as mentioned above it will be needed if the circuit breaker must be made dead, so that it can be serviced by the personnel without any danger or because the circuit breaker has to be exchanged.

The invention has for its object starting from the known principle to provide a simple switching apparatus, in which circuit breakers are not necessary anymore.

The invention provides an apparatus of the type mentioned above, which is characterized in that each of the two switching paths is constituted by a vacuum switching path, and that the barrier serves to prevent switching off products from the one switching path from transferring to the other switching path.

If in the switching apparatus according to the present invention a cable is switched off, for which purpose the two vacuum switching paths are opened and the grounding device is switched on, a surge voltage will break down the vacuum switching path on the side of the busbar system, and the charge is conducted to ground, without the cable being raised to a high voltage. The broken down vacuum switching path, however, will extinguish automatically, which results from the characteristics of the vacuum switch, so that an individual circuit breaker is not necessary anymore. Herewith an isolating switch arranged between the busbar system and the circuit breaker is also not necessary anymore, since vacuum switches do not need any maintenance. The barrier between both vacuum switching paths now serves to prevent the switching off products from one vacuum switching path at its break down from being introduced between the contacts of the other opened vacuum switching path, which thereby could also break down, with the consequence that safety is no longer guaranteed.

According to a first embodiment of present invention each vacuum switching path comprises a single vacuum switch.

As an alternative the two vacuum switching paths are accommodated in one and the same vacuum switch.

The invention will now be explained further in reference to the drawing, in which:

FIG. 2 illustrates a vacuum switch with two vacuum paths with transverse bridging contact member, which also supports the barrier, FIG. 3 illustrates a vacuum switch with two vacuum switch paths in which the transverse bridging contact also acts as the grounding contact.

Figure 1:
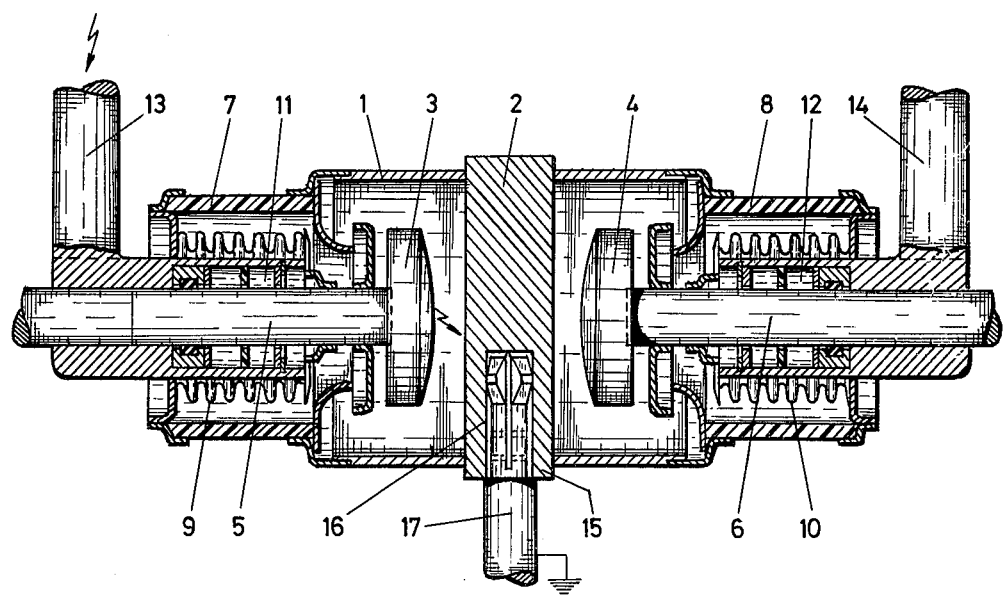
FIG. 1 illustrates a vacuum switch having two vacuum switch paths with interposed barrier.

FIG. 1 illustrates a vacuum switch, which is provided with a metallic housing 1, in which a stationary barrier 2 is provided. In each halve of the housing a movable contact member 3 and 4, respectively, is provided, and the contact members 3 and 4 are mounted on two movable contact rods 5, 6 respectively. The metallic housing 1 is provided with two insulators 7, 8, to which the movable contact rods 5, 6 are secured in a vacuum tight fashion by means of the bellows 9, 10. At 11 and 12 current collecting contacts are indicated, by means of which the current from the contact rods 5 and 6 respectively, is transferred to the stationary terminal rods 13 and 14, respectively. The switch is illustrated in its opened condition, and in order to close the switch the contact rods 5, 6 should be pressed towards one another by means of an operating mechanism, which is not shown. In a closed condition of the vacuum switch the two contact members 3, 4 engage the barrier 2 at both sides. The barrier 2 constitutes a separating bridge for contact members 3, 4. The barrier 2 has an edge 15, which projects outside of the housing 1 of the vacuum switch, and in that edge a hole 16 is provided, in which a grounding pin 17 can be plugged. If it is assumed that the one contact member 3 is connected to a busbar system through the contact rod 5 and the terminal 13, and that the other contact member 4 is connected to a feeder cable through the contact rod 6 and the terminal rod 14, and furthermore that the switch as illustrated in FIG. 1 is open, a surge voltage on the busbar system (see the arrow) will cause a break down between the one contact member 3 and the grounded barrier 2, which is conducted to ground through the grounding pin 17, so that the contact member 4 together with the cable connected thereto will not become alive. The cable is not grounded, so that measurements can be made on it.

FIG. 2 shows another embodiment of the vacuum switch according to the present invention and therein two stationary contact members 21, 22 are provided in the housing 18 of the vacuum switch by means of the insulators 19, 20. The contact rods 23 and 24, respectively, supporting the contact members 21, 22, are sealed to the insulators 19, 20 unmovably. Between the two contact members 21, 22 is a barrier 25, which is provided on the third contact member 26 in the form of a cylinder, which can be moved up and down by means of the switching rod 27. Switching rod 27 again is conneccted in a vacuum tight fashion to the insulator 29 by means of a bellows 28, and the insulator 29 which is also secured to the housing 18 in a vacuum tight fashion comprises two portions 29' and 29" between which a stationary grounded annular contact member 30 is inserted. This stationary grounding contact 30 cooperates with the movable grounding contact 31 on the switching rod 27. In FIG. 2 the third contact member 26 is illustrated in the so-called intermediate position, and the switched-on position is indicated with the dotted lines and the completely switched-off position with the dot and dash lines 26".

In the closed position of the vacuum switch the third contact member 26 is in the dotted position 26', and the two stationary contact members 21, 22 are bridged. In order to switch the vacuum switch off, the third contact member 26, by means of the switching rod 27, is first transferred to the intermediate position as shown, and that intermediate position is maintained for a time sufficient to let the switching arcs extinguish. As soon as the arcs have been extinguished, the movable third contact member 26 is transferred to the position 26", in which the barrier 25 is connected to ground the third contact member 26", the grounding contact 31, the stationary grounded contact 30 and the ground connection. Again a surge voltage from one of the contact members, such as 21, is intercepted by the grounded barrier 25, so that the other contact member 22 will not be affected thereby.

FIG. 3 illustrates an embodiment of the vacuum switch according to the invention, which in principle corresponds to the arrangement of FIG. 2, but in which the movable grounding contact and the stationary grounding contact are differently arranged. In the FIG. 3 structure two contact members 33 and 34 are also provided, which are mounted on the contact rods 35 and 36, respectively. The contact rods 35 and 36 are mounted in the metallic housing 32 of the vacuum switch by means of the disc-shaped insulators 37 and 38.

The third bridging contact member 40 is again arranged cylindrically and the barrier 39 has again the shape of a bulk head in cylinder 40. The third contact member is provided on a movable contact rod 41, which by means of a bellows 42 is secured to the housing in a vacuum tight fashion. The movable grounding contact 33 is provided on the third contact member 40, and the stationary grounding contact is now in the form of a stationary pin 44. In the completely closed condition the third contact member is in the position 40', which is indicated with a dash and dot line, and in this condition the two members 33 and 34 are bridged. In the intermediate position, which is illustrated in FIG. 3, the extinction of the switching arcs has to be awaited. Then the contact rod 41 is displaced, until the third contact member 40 will come in the dotted position 40", in which the movable grounding contact 43 engages the stationary grounding pin 44. In the latter position the barrier 39 is grounded through the third contact member 40, the movable grounding contact 43 and the stationary grounding pin 44.

Figure 4:
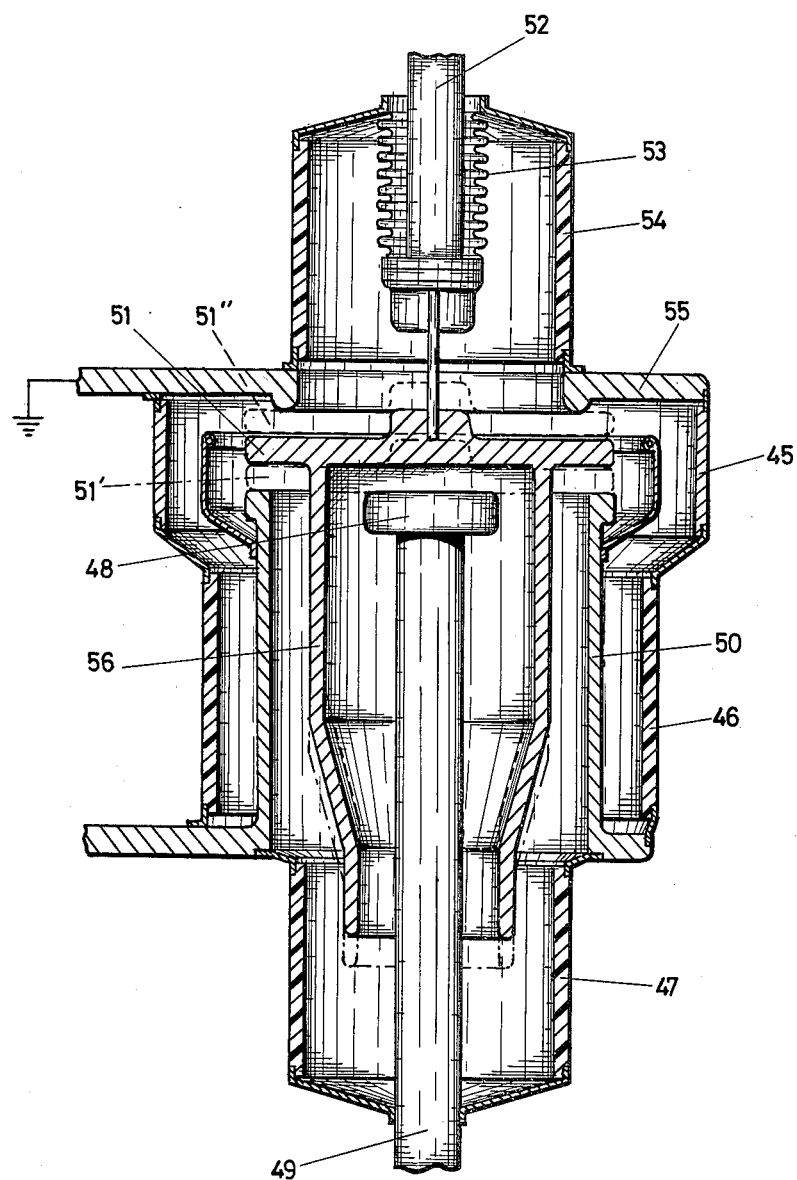
FIG. 4 illustrates a similar arrangement, which, however, is arranged coaxially.

FIG. 4 illustrates a coaxial arrangement, which is particularly suitable to apply a magnet coil to achieve a coaxial magnetic field, which has a favourable influence on the interrupting characteristics of the vacuum switch. The housing 45 of the vacuum switch is provided with two insulators. Through the one insulator 47 the stationary contact member 48 is unmovably secured in the housing 45 by means of the contact rod 49, whereas the associated stationary contact member 50 is in the form of a cylinder and is secured to the housing by means of the insulator 46. The third movable contact member 51 can be driven through the contact rod 52, which is secured to the bellows 53, which is retained by the insulator 54. The switching apparatus is again illustrated in the intermediate position. The bridging contact member 51 also acts as the grounding contact element, cooperating with the annular contact 55, which is grounded and is an integral part of the housing of the vacuum switch. The bridging contact 51 is provided with a coaxial barrier 56, which again intercepts break downs between the stationary contact member 48 and the cylindrical contact member 50.

If the switch in FIG. 4 is in the closed position, the third contact member 51 is in the position 51' indicated with the dash and dot lines. Then the contact member 51 is transferred to the intermediate position as shown by means of the operating rod 52 and it is awaited until the arcs between the contact member 48 and the bridging contact member 51 and the cylindrical contact 50 and bridging contact 51 have been extinguished. Then the third contact member 51 is transferred to the dotted grounding position 51", so that the third contact 51 with the coaxial barrier 56 is grounded through the ring 55. Again a spark-over between the cylindrical contact member 50 and the pin contact 48 is intercepted and conducted to ground through the coaxial barrier 56 and the grounded annular contact 55.

Figure 5:
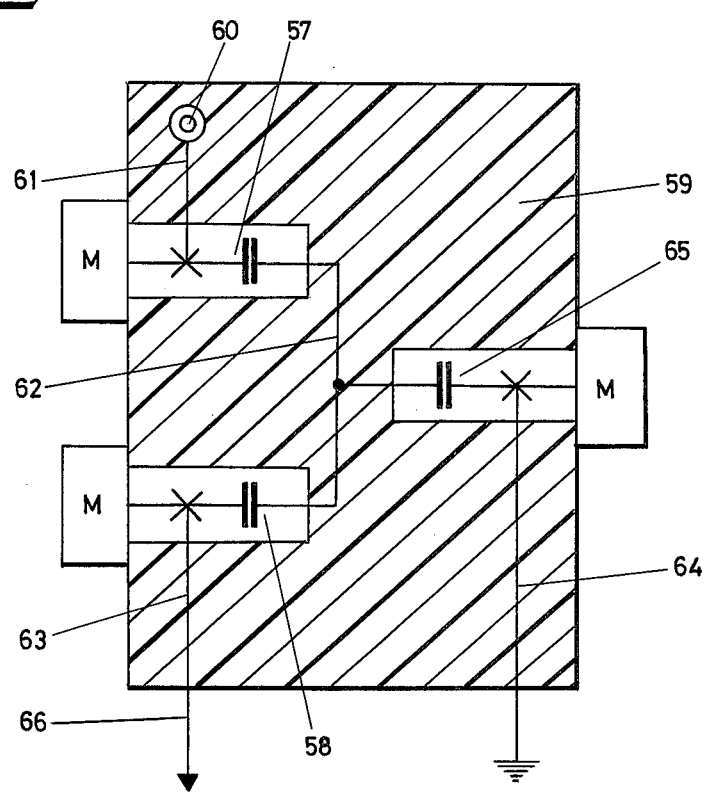
FIG. 5 is a schematic illustration of a switching apparatus with individual vacuum switches, in which each vacuum switch path is included in an individual vacuum switch.

In the embodiment of the invention according to FIG. 5 an individual vacuum switch is used for each vacuum switching path. The vacuum switches are schematically illustrated at 57 and 58. They are embedded in a moulded resin body 59 together with the busbar system 60, the connecting conductors 61, 62, the cable terminal conductor 63 and the grounding conductor 64. The operating mechanisms for the vacuum switches are indicated at M. The grounding of the common terminal of the vacuum switches can be switched on and off with a third vacuum switch 65.

If in FIG. 5 the cable 66 has to be switched on, the two switches 57, 58 are closed and switch 65 should be open. To switch the cable off, the vacuum switches 57 and 58 are opened and the vacuum switch 65 is closed. A surge voltage, which breaks down the vacuum switch 57 for example, is now conducted to ground through 65 and cannot reach the dead cable 66.

I claim:

1. Vacuum switching apparatus for interconnecting a bus bar to a feeder cable and selectively connecting said bus bar and said feeder cable to ground, comprising:
    a housing;
    a first vacuum switch within said housing and connected to said bus bar;
    a second vacuum switch within said housing and connected to said feeder cable;
    a barrier mounted between said first and second vacuum switches for conducting switch-off current therefrom to ground; and
    grounding means for interconnecting said barrier to ground.

2. Vacuum switching apparatus as in claim 1 wherein each said vacuum switch includes a movable contact, said movable contacts being aligned with one another and movable between open and closed positions, said barrier interconnecting said movable contacts in their closed positions, said barrier further including a terminal means accessible from the exterior of said housing, said grounding means being connected to said terminal means.

3. Vacuum switching apparatus as in claim 1 wherein each of said vacuum switches includes a stationary contact, said stationary contacts being spaced from one another in aligned axial relationship, said vacuum switching apparatus further comprising a third movable contact supporting said barrier in a direction transverse to the axis of said stationary contacts, said grounding means including an axially movable contact rod extending from said housing and carrying said barrier, said contact rod including a grounding contact, said vacuum switching apparatus further comprising a stationary grounded contact, and said axially movable contact rod being movable into a switching-on position wherein said third movable contact interconnects said two stationary contacts, an intermediate position wherein at least one of said stationary contacts and said barrier are in non-contacting relationship, and a grounding position wherein said grounding contact contacts said stationary grounding contacts for grounding said barrier.

4. Vacuum switching apparatus as in claim 1 wherein each of said vacuum switches includes a stationary contact, said stationary contacts being spaced from one another in aligned axial relationship, said apparatus further comprising a third movable contact supporting said barrier in a direction transverse to the axis of said stationary contacts, said grounding means including an axially movable contact rod extending from said housing and carrying said barrier, said grounding means further including a stationary grounding contact in the form of a pin extending from said housing opposite from said axially movable contact rod, said axially movable contact rod being movable to a switching-on position wherein said movable contact interconnects said two stationary contacts, an intermediate position wherein at least one of said stationary contacts and said barrier are in non-contacting relationship, a switched-off position wherein said movable contact contacts with said stationary grounded contact whereby said barrier is grounded.

5. Vacuum switching apparatus as in claim 1 wherein each of said vacuum switches includes a stationary contact, said stationary contacts being coaxially mounted within said housing, each of said stationary contacts including a free end, said vacuum switchingg apparatus further comprising a third movable contact for supporting said barrier, a movable contact rod extending from said housing in opposing relationship to said stationary contacts, a grounding ring forming an integral part of said housing, said axially movable contact rod being movable between a switched-on position wherein said movable contact bridges said two stationary contacts, an intermediate position wherein at least one of said stationary contacts and said barrier are in non-contacting relationship, and a switched-off position wherein said grounding ring engages said movable contact rod whereby said barrier is grounded.

* * * * *